United States Patent
Gallman et al.

(10) Patent No.: US 10,532,805 B2
(45) Date of Patent: Jan. 14, 2020

(54) AIRFOIL FOR AN AIRCRAFT HAVING REDUCED NOISE GENERATION

(71) Applicant: Gulfstream Aerospace Corporation, Savannah, GA (US)

(72) Inventors: Judith Gallman, Savannah, GA (US); Thomas Van de Ven, Savannah, GA (US); Tyler Relf, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 463 days.

(21) Appl. No.: 15/270,634

(22) Filed: Sep. 20, 2016

(65) Prior Publication Data

US 2018/0079489 A1 Mar. 22, 2018

(51) Int. Cl.
*B64C 9/18* (2006.01)
*B64C 21/08* (2006.01)
*B64C 21/02* (2006.01)

(52) U.S. Cl.
CPC .............. *B64C 9/18* (2013.01); *B64C 21/025* (2013.01); *B64C 21/08* (2013.01); *B64C 2230/06* (2013.01); *B64C 2230/14* (2013.01); *B64C 2230/20* (2013.01); *Y02T 50/166* (2013.01)

(58) Field of Classification Search
CPC ....... B64C 21/025; B64C 21/08; B64C 21/04; B64C 2230/06; B64C 2230/14; B64C 2230/20; B64C 9/18; F01D 5/145; F05D 22/96; Y02T 50/166
See application file for complete search history.

(56) References Cited

U.S. PATENT DOCUMENTS

| | | | | | |
|---|---|---|---|---|---|
| 1,394,344 | A | * | 10/1921 | Page | B64C 9/24 244/210 |
| 1,540,505 | A | * | 6/1925 | Sessions | H01B 17/14 174/150 |
| 2,202,430 | A | * | 5/1940 | Rebeski | B64C 9/16 244/216 |
| 2,222,935 | A | * | 11/1940 | Chilton | B64C 9/28 244/214 |
| 2,426,785 | A | * | 9/1947 | Naumann | B64C 9/16 244/216 |
| 2,492,245 | A | * | 12/1949 | Sutton | B64C 21/08 244/13 |

(Continued)

FOREIGN PATENT DOCUMENTS

GB 423565 A * 2/1935 ............. B64C 21/02

*Primary Examiner* — Medhat Badawi
(74) *Attorney, Agent, or Firm* — LKGlobal | Lorenz & Kopf, LLP

(57) ABSTRACT

An airfoil is provided having reduced noise generation for use with an aircraft. The airfoil includes a body and a cover. The body has a leading edge spaced from a trailing edge and a side surface disposed between the leading edge and the trailing edge. The body defines an inlet proximate the leading edge and configured to receive air. The side surface defines an outlet in fluid communication with the inlet. The outlet is configured to exhaust air away from the side surface. The cover overlies the inlet and is movable between a first and a second cover position. The cover is configured to prevent movement of air through the inlet when the cover is in the first cover position and configured to permit movement of air through the inlet when the cover is in the second cover position.

16 Claims, 4 Drawing Sheets

(56) References Cited

U.S. PATENT DOCUMENTS

| | | | | |
|---|---|---|---|---|
| 2,502,315 A * | 3/1950 | Earhart | B64C 9/16 | 244/216 |
| 2,562,929 A * | 8/1951 | Lord, Jr. | G01V 5/02 | 250/253 |
| 2,661,166 A * | 12/1953 | Gordon | B64C 9/16 | 244/216 |
| 2,836,380 A * | 5/1958 | Pearson | B64C 9/16 | 244/216 |
| 3,012,740 A * | 12/1961 | Wagner | B64C 23/005 | 244/208 |
| 3,289,770 A * | 12/1966 | Derschmidt | B64C 27/001 | 416/102 |
| 3,568,957 A * | 3/1971 | Wood | B64C 9/16 | 244/216 |
| 3,596,854 A * | 8/1971 | Haney, Jr. | B64C 23/065 | 244/199.3 |
| 3,669,386 A * | 6/1972 | Jacobs | B64C 9/38 | 244/207 |
| 3,698,664 A * | 10/1972 | Bonney | B64C 9/16 | 244/216 |
| 3,778,009 A * | 12/1973 | Jones | B64C 9/20 | 244/215 |
| 3,881,669 A * | 5/1975 | Lessen | B64C 23/06 | 244/130 |
| 4,039,161 A * | 8/1977 | Bauer | B64C 23/06 | 138/39 |
| 4,131,252 A * | 12/1978 | Dean | B64C 9/16 | 244/130 |
| 4,213,587 A * | 7/1980 | Roeseler | B64C 9/16 | 244/213 |
| 4,470,366 A * | 9/1984 | Williams | B63B 1/248 | 114/280 |
| 4,836,473 A * | 6/1989 | Aulehla | B64C 21/00 | 244/130 |
| 5,158,251 A * | 10/1992 | Taylor | B64C 9/38 | 244/199.3 |
| 5,178,348 A * | 1/1993 | Bliesner | B64C 3/14 | 244/200 |
| 5,209,438 A * | 5/1993 | Wygnanski | B64C 23/00 | 244/200.1 |
| 5,253,828 A * | 10/1993 | Cox | B64C 23/06 | 244/200.1 |
| 5,335,886 A * | 8/1994 | Greenhalgh | B64C 3/44 | 244/213 |
| 5,562,414 A * | 10/1996 | Azuma | B64C 23/06 | 244/1 N |
| 5,622,336 A * | 4/1997 | Chavanne | B64C 7/00 | 244/129.1 |
| 5,697,394 A * | 12/1997 | Smith | B64D 33/02 | 137/15.1 |
| 5,738,298 A * | 4/1998 | Ross | B64C 7/00 | 244/1 N |
| 5,836,550 A * | 11/1998 | Paez | B64C 9/22 | 244/214 |
| 5,871,174 A * | 2/1999 | Hannay | B64C 3/10 | 244/199.2 |
| 6,092,766 A * | 7/2000 | LaRoche | B64C 21/10 | 244/198 |
| 6,283,406 B1 * | 9/2001 | Remington | B64C 23/06 | 244/1 N |
| 6,349,899 B1 * | 2/2002 | Ralston | B64D 33/02 | 244/53 B |
| 6,491,260 B2 * | 12/2002 | Borchers | B64C 21/10 | 244/199.1 |
| 6,729,583 B2 * | 5/2004 | Milliere | B64C 7/00 | 244/213 |
| 7,100,875 B2 * | 9/2006 | Shmilovich | B64C 23/065 | 244/199.4 |
| 7,143,983 B2 * | 12/2006 | McClure | B64C 15/14 | 244/204 |
| 7,484,930 B2 * | 2/2009 | Hutcheson | B64C 21/04 | 415/119 |
| 7,686,253 B2 * | 3/2010 | Lewis | G05D 1/0055 | 244/136 |
| 7,753,316 B2 * | 7/2010 | Larssen | B64C 7/00 | 244/199.4 |
| 7,815,147 B2 * | 10/2010 | Martin Hernandez | B64C 7/00 | 244/130 |
| 7,874,524 B2 * | 1/2011 | Lee | B64C 3/58 | 244/199.4 |
| 8,128,037 B2 * | 3/2012 | Powell | B64C 21/08 | 244/130 |
| 8,152,109 B2 * | 4/2012 | Silich | B64C 15/14 | 244/208 |
| 8,245,976 B2 * | 8/2012 | Sakurai | B64C 21/02 | 244/129.5 |
| 8,251,319 B2 * | 8/2012 | Jonker | B64C 9/18 | 244/204 |
| 8,449,255 B2 * | 5/2013 | Tadayon | F03D 1/065 | 416/23 |
| 8,651,813 B2 * | 2/2014 | Long | B63B 35/7926 | 416/90 A |
| 8,695,915 B1 * | 4/2014 | Jones | B64C 9/18 | 244/1 N |
| 8,827,212 B1 * | 9/2014 | Shmilovich | B64C 21/08 | 244/207 |
| 9,132,909 B1 * | 9/2015 | Khorrami | B64C 9/18 | |
| 9,227,719 B2 * | 1/2016 | Khorrami | B64C 1/40 | |
| 9,638,176 B2 * | 5/2017 | Shivashankara | B64C 9/32 | |
| 9,701,399 B1 * | 7/2017 | Booher, Sr. | B64C 21/06 | |
| 2002/0005462 A1 * | 1/2002 | Broadbent | B64C 9/22 | 244/214 |
| 2004/0004162 A1 * | 1/2004 | Beyer | B64C 9/18 | 244/216 |
| 2004/0065783 A1 * | 4/2004 | Robinson | B64C 9/14 | 244/216 |
| 2004/0251383 A1 * | 12/2004 | McDonnell | B64C 27/615 | 244/82 |
| 2006/0006290 A1 * | 1/2006 | Loth | B64C 11/001 | 244/199.2 |
| 2009/0084905 A1 * | 4/2009 | Mau | B64C 9/20 | 244/207 |
| 2009/0134281 A1 * | 5/2009 | Engelbrecht | B64C 9/16 | 244/215 |
| 2009/0200431 A1 * | 8/2009 | Konings | B64C 3/385 | 244/213 |
| 2009/0206206 A1 * | 8/2009 | Chase | B64C 3/10 | 244/199.4 |
| 2010/0294883 A1 * | 11/2010 | Trichs, Jr. | B64C 7/00 | 244/1 N |
| 2011/0114795 A1 * | 5/2011 | Voss | B64C 9/18 | 244/213 |
| 2011/0131884 A1 * | 6/2011 | Herper | E05F 1/105 | 49/386 |
| 2012/0223190 A1 * | 9/2012 | Rist | B64C 21/025 | 244/208 |
| 2012/0256049 A1 * | 10/2012 | Shmilovich | B64C 9/38 | 244/1 N |
| 2013/0134265 A1 * | 5/2013 | Rolt | B64D 27/18 | 244/73 R |
| 2014/0014780 A1 * | 1/2014 | Isotani et al. | B64C 9/18 | 244/199.4 |
| 2014/0217236 A1 * | 8/2014 | Bonatto | B64C 7/00 | 244/1 N |
| 2015/0053825 A1 * | 2/2015 | Isotani | B64C 9/18 | 244/213 |
| 2015/0093244 A1 * | 4/2015 | Wigen | G01K 13/028 | 416/61 |
| 2018/0079489 A1 * | 3/2018 | Gallman | B64C 9/18 | |
| 2018/0251221 A1 * | 9/2018 | Chu | B64D 1/12 | |

* cited by examiner

AIRFOIL FOR AN AIRCRAFT HAVING REDUCED NOISE GENERATION

TECHNICAL FIELD

The present invention generally relates to aircraft and more particularly relates to aircraft manufacturing, testing, and maintenance.

BACKGROUND

Aircraft commonly extend flaps during approach to landing to lower the speed of the aircraft while still maintaining the amount of lift necessary to keep the aircraft airborne. While the flaps are extended, airframe noise is generated by the flap side surface. As a result of the pressure gradient due to lift at the inboard and outboard locations of the flap, a vortex of air is formed from a circulation of air between a high pressure zone beneath the flap and a low pressure zone above the flap. This vortex of air "scrubs" against a top surface of the flap adjacent the side surface. As a result of the vortex of air scrubbing the top surface, the air pressure on the top surface fluctuates in a turbulent manner. This air pressure fluctuation on the top surface generates noise (e.g., a dipole noise source is generated).

Accordingly, it is desirable to provide a flap configuration capable of creating both the increased lift needed for optimal takeoff and landing while minimizing the self-noise due to such a configuration. Furthermore, other desirable features and characteristics will become apparent from the subsequent summary and detailed description and the appended claims, taken in conjunction with the accompanying drawings and the foregoing technical field and background.

BRIEF SUMMARY

Various non-limiting embodiments of an airfoil having reduced noise generation for use with an aircraft, and various non-limiting embodiments of an aircraft, are disclosed herein.

In a first non-limiting embodiment, the airfoil includes, but is not limited to, a body having a leading edge spaced from a trailing edge and a side surface disposed between the leading edge and the trailing edge. The body defines an inlet proximate to the leading edge and configured to receive air. The side surface defines an outlet in fluid communication with the inlet. The outlet is configured to exhaust air away from the side surface. The airfoil further includes a cover overlying the inlet and movable between a first cover position and a second cover position. The cover is configured to prevent movement of air through the inlet when the cover is in the first cover position and configured to permit movement of air through the inlet when the cover is in the second cover position.

In another non-limiting embodiment, the aircraft includes, but is not limited to, an airfoil. The airfoil includes, but is not limited to, an aircraft wing coupled to the aircraft. The airfoil further includes a flap movably coupled to the aircraft wing and having a leading edge spaced from a trailing edge. The flap extends to a side surface disposed between the leading edge and the trailing edge. The flap defines an inlet proximate the leading edge and configured to receive air. The side surface defines an outlet in fluid communication with the inlet. The outlet configured to exhaust air away from the side surface. The airfoil further includes a cover overlying the inlet and movable between a first cover position and a second cover position. The cover is configured to prevent movement of air through the inlet when the cover is in the first cover position and configured to permit movement of air through the inlet when the cover is in the second cover position.

BRIEF DESCRIPTION OF THE DRAWINGS

The present invention will hereinafter be described in conjunction with the following drawing figures, wherein like numerals denote like elements.

DETAILED DESCRIPTION

Figure 1:
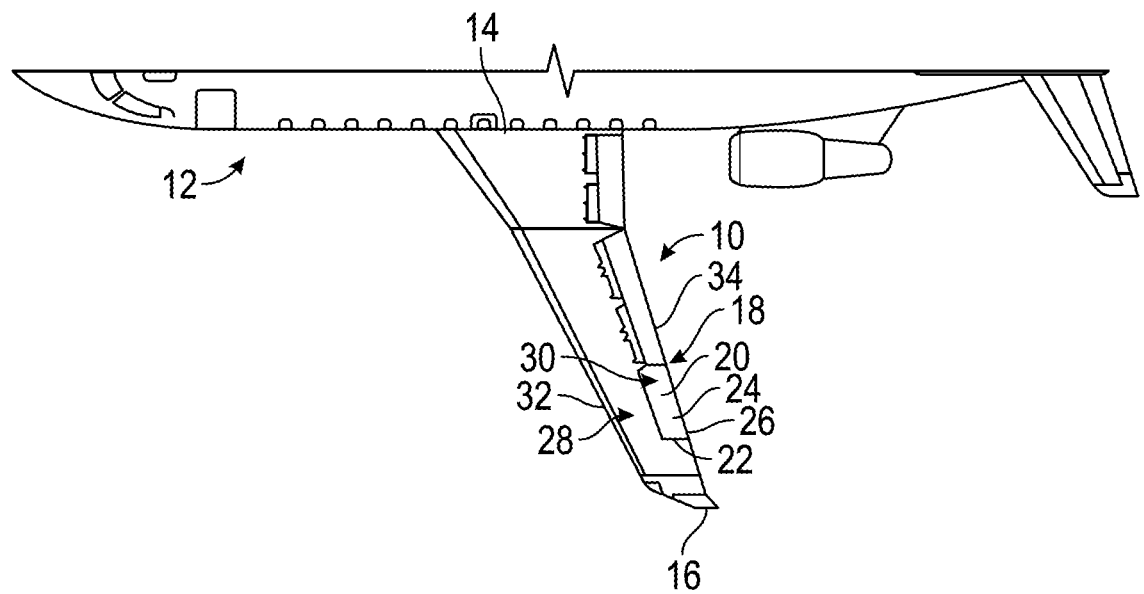
FIG. 1 is a perspective view illustrating a non-limiting embodiment of an airfoil for an aircraft with the airfoil including an aircraft wing and a flap.

The following detailed description is merely exemplar in nature and is not intended to limit the invention or the application and uses of the invention. Furthermore, there is no intention to be bound by any theory presented in the preceding background or the following detailed description.

An airfoil having reduced noise generation for use with an aircraft is provided herein. In an exemplary embodiment, the airfoil includes an aircraft wing and a flap moveably coupled to the aircraft wing with the flap having a side surface. The flap has a leading edge spaced from a trailing edge with the side surface disposed between the leading edge and the trailing edge. The flap also has an outer surface including an upper surface portion and a lower surface portion with the side surface generally perpendicular to the outer surface and disposed between the upper surface portion and the lower surface portion. As the flap moves through air, a vortex of air can "scrub" against the upper surface portion. The vortex of air is formed from a circulation of air between a high pressure zone beneath the flap and a low pressure zone above the flap. As a result of the vortex of air scrubbing the upper surface portion, the air pressure on the upper surface portion fluctuates in a turbulent manner. This air pressure fluctuation on the upper surface portion generates noise (e.g., a dipole noise source is generated).

The flap defines an inlet proximate the leading edge of the flap. The inlet is configured to be in alignment with a stagnation point that develops common the leading edge when the flap moves through air. The side surface of the flap defines an outlet in fluid communication with the inlet such that air received by the inlet from the environment is exhausted through the outlet and back to the environment. The outlet is configured to exhaust air away from the side surface.

The flap may be moveable relative to the aircraft wing between a first flap position and a second flap position. It is to be appreciated that the flap may be movable between a series of intermediate locations between the first flap position and the second flap position. As the flap transitions from the first flap position to the second flap position, the inlet is out of alignment with the stagnation point that develops adjacent the leading edge when the flap moves through air. When the flap is in the second flap position, the inlet is in alignment with the stagnation point that develops adjacent the leading edge. The airfoil further includes a cover overlying the inlet with the cover movable between a first cover position and a second cover position. The cover is configured to prevent movement of air through the inlet when the cover is in the first cover position and configured to permit movement of air through the inlet when the cover is in the second cover position.

When the flap is in the first flap position, or transitioning from the first flap position to the second flap position, the cover is in the first cover position and prevents movement of air through the inlet. When the flap is in the second flap position, the cover is in the second cover position and permits movement of air through the inlet. The air that moves through the inlet, is directed to the outlet, and exhausted from the outlet. The air exhausted from the outlet moves the vortex of air away from the flap, thereby minimizing the air pressure fluctuation on the upper surface portion. To this end, noise generated by this pressure fluctuation is reduced (i.e., improved).

A greater understanding of the airfoil described above and of the method for reducing noise generation of the airfoil may be obtained through a review of the illustrations accompanying this application together with a review of the detailed description that follows.

FIG. 1 is a non-limiting embodiment of a perspective view illustrating an airfoil 10 having reduced noise generation for use with an aircraft 12. The airfoil 10 has a first end 14 coupled to the aircraft 12 and extends to a second end 16 spaced from the aircraft 12. The airfoil 10 includes a body 18. In embodiments, the body 18 includes an aircraft wing 28 and a flap 30 moveably coupled to the aircraft wing 28. The aircraft wing 28 may be coupled to the aircraft 12 at the first end 14 of the airfoil 10 and extend to the second end 16 of the airfoil 10. The aircraft wing 28 may have a forward wing portion 32 spaced from an aft wing portion 34. The flap 30 may be coupled to the aircraft wing 28 adjacent the aft wing portion 34. Non-limiting examples of the flap 30 coupled adjacent the aft wing portion 34 include Fowler flaps, plain flaps, slotted flaps, and the like. In certain embodiments, the flap 30 is a Fowler flap. However, it is to be appreciated that the flap 30 may be coupled adjacent any portion of the aircraft wing 28. For example, the flap 30, may be coupled adjacent the forward wing portion 32, such as a Krueger flap.

Figure 2:
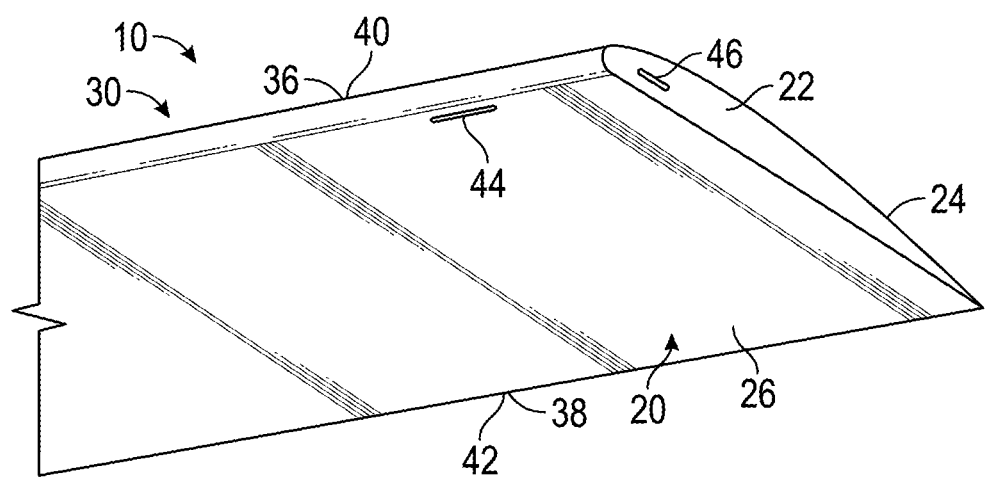
FIG. 2 is a perspective view illustrating the flap of FIG. 1.

The body 18 has an outer surface 20 and a side surface 22. In certain embodiments, the flap 30 has the outer surface 20 and the side surface 22. However, as will be described in greater detail below, the aircraft wing 28 may have the outer surface 20 and the side surface 22. The outer surface 20 includes an upper surface portion 24 and a lower surface portion 26 (as best seen in FIG. 2). The side surface 22 may be generally perpendicular to the outer surface 20 and may be disposed between the upper surface portion 24 and the lower surface portion 26. The side surface 22 may face away from the aircraft 12 (i.e. outboard) or face toward the aircraft 12 (i.e. inboard). In certain embodiments, the side surface 22 faces away from the aircraft 12. It is to be appreciated that the body 18 may include additional side surfaces with each of the additional side surfaces independently facing away from the aircraft 12 or facing toward the aircraft 12.

FIG. 2 is a perspective view illustrating the flap 30 of FIG. 1. The flap 30 may have a forward flap portion 36 spaced from an aft flap portion 38. In certain embodiments, the flap 30 has a leading edge 40 at a forward most portion of flap 30 and a trailing edge 42 disposed at an aft most portion of flap 30. Side surface 22 extends between the leading edge 40 and the trailing edge 42. In these embodiments, the leading edge 40 is adjacent the forward flap portion 36 and the trailing edge 42 is adjacent the aft flap portion 38. As the flap 30 moves through air, a vortex of air can "scrub" against the upper surface portion 24. The vortex of air is formed from a circulation of air between a high pressure zone beneath the flap 30 and a low pressure zone above the flap 30. As a result of the vortex of air scrubbing the upper surface portion 24, the air pressure on the upper surface portion 24 fluctuates in a turbulent manner. This air pressure fluctuation on the upper surface portion 24 generates noise (e.g., a dipole noise source is generated).

In embodiments, the flap 30 defines an inlet 44. The inlet 44 may be proximate the leading edge 40. In an exemplary embodiment, the inlet 44 is defined by the lower surface portion 26 adjacent the leading edge 40. The inlet 44 may have a generally elongated slot-like configuration that extends along the leading edge 40. The inlet 44 is configured to receive air from the environment outside the aircraft 12. In certain embodiments, the inlet 44 is configured to be in alignment with a stagnation point that develops adjacent the leading edge 40 when the flap 30 moves through air. As will be described in greater detail below, air intake by the inlet 44 proceeds in a "passive" manner. In other words, air is received from the environment without the use of pumps, turbines, engines, or any other "active" manner for being provided air. It is to be appreciated that the flap 30 may define more than one inlet configured to receive air from the environment outside the aircraft 12.

In embodiments, the side surface 22 of the flap 30 defines the outlet 46. The outlet 46 may have a generally elongated slot-like configuration that extends along the side surface 22. The outlet 46 is in fluid communication with the inlet 44 such that air received by the inlet 44 from the environment is exhausted through the outlet 46 and back to the environment. The outlet 46 is configured to exhaust air away from the side surface 22. In certain embodiments, the air exhausted from the outlet 46 moves the vortex of air away from the side surface 22 thereby minimizing the air pressure fluctuation on the upper surface portion 24. To this end, noise generated by this pressure fluctuation is reduced (i.e., improved). It is to be appreciated that the flap 30 may define more than one outlet configured to exhaust air away from the side surface 22. In one embodiment, the outlet 46 is configured to exhaust air away from and perpendicular to the side surface 22. In other embodiments, the outlet 46 is configured to exhaust away and transverse to the side surface 22 at an angle of at least 10, at least 22, at least 32, at least 42, at least 52, at least 62, at least 70, or at least 80, degrees, each relative to the side surface 22. The angle of exhaust may be at any direction relative to the airfoil 10 such as toward the upper surface portion 24, lower surface portion 26, leading edge 40, trailing edge 42, and combination thereof, so long as the outlet 46 is configured to exhaust away from the side surface 22. In another embodiment, the outlet 46 is configured to exhaust air away from and transverse to the side surface 22 toward the lower surface portion 26 of the flap 30.

In some embodiments, a duct, conduit, or other suitable fluid communication structure (not shown) may guide the air that enters inlet 44 and direct it to outlet 46. The use of such a structure may facilitate control over the direction at which air vents from outlet 46. In some embodiments, the duct, conduit, or other suitable fluid communication structure may have contours, surfaces, and/or dimensions that are configured to accelerate (or decelerate) the air moving between inlet 44 and outlet 46. By accelerating the air as it passes through flap 30, the flow of air vented through outlet 46 may intercept the vortex of air with greater force and momentum and may more effectively push the vortex of air away from second end 16, thereby avoiding altogether the scrubbing that gives rise to the undesirable noise.

Figure 3A:
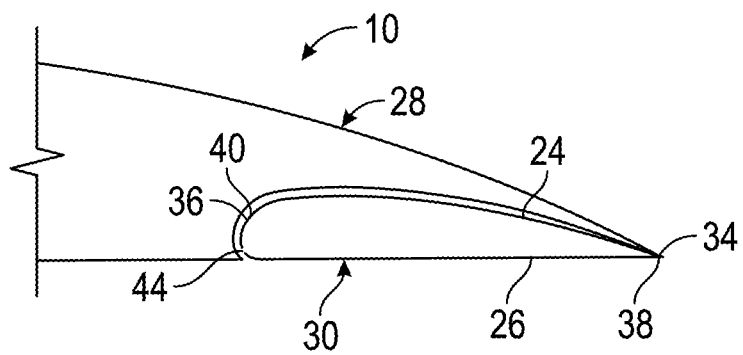
FIGS. 3A, 3B, and 3C are schematic views illustrating the flap in relation to the aircraft wing of FIG. 1.
Figure 3B:
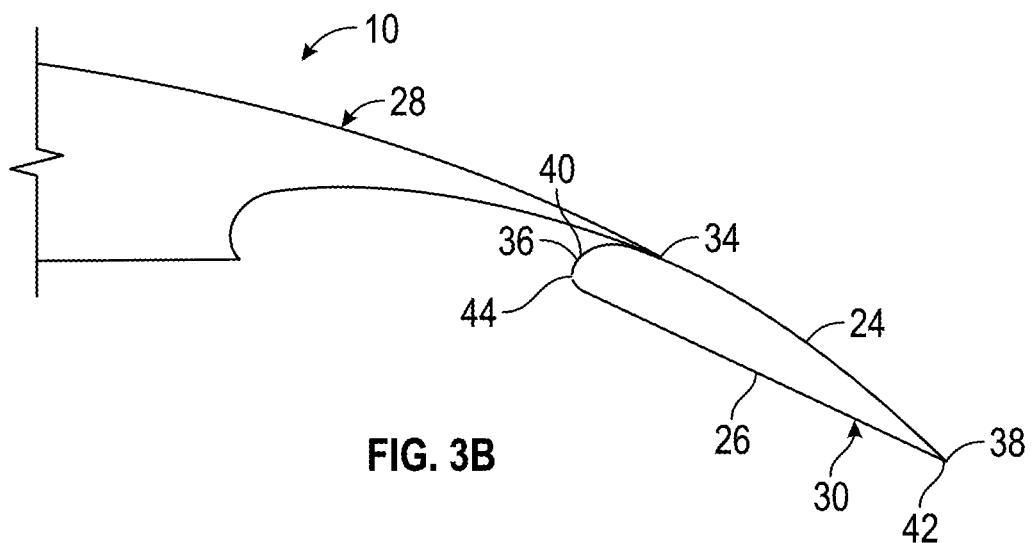
Figure 3C:
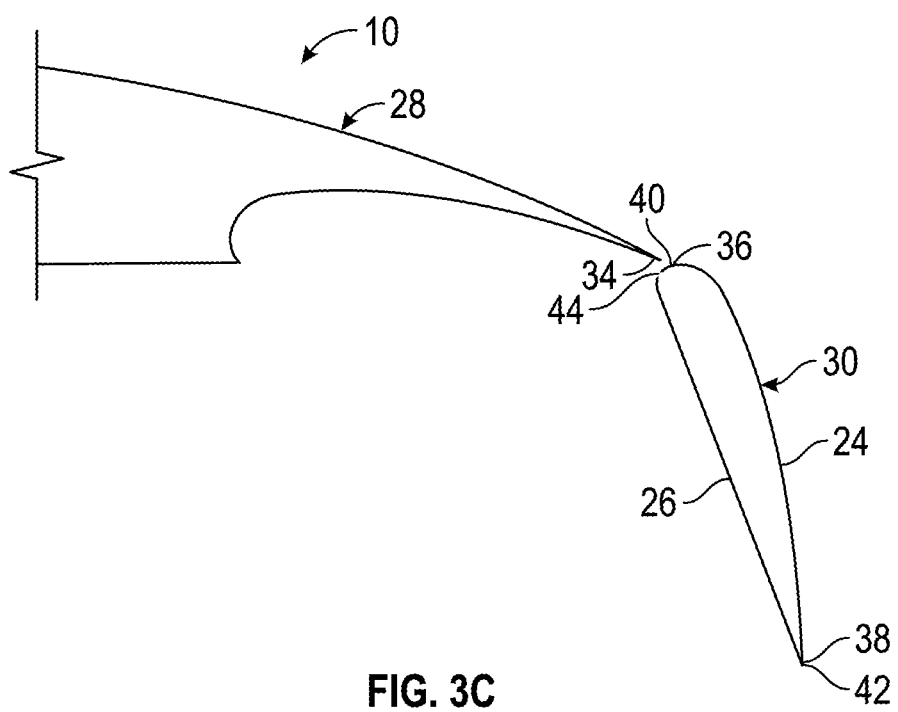

FIGS. 3A, 3B, and 3C are schematic views illustrating the flap 30 in relation to the aircraft wing 28. The flap 30 may be moveable relative to the aircraft wing 28 between a first flap position and a second flap position. In embodiments, the first flap position is commonly referred to as "flaps stowed" or "flaps 0" and the second flap position is commonly referred to as "approach or landing position" or "flaps 39." However, it is to be appreciated that the first flap position and the second flap position may refer to any position between the first flap position and the second flap position. It is also to be appreciated that the flap 30 may be moveable to additional intermediate flap positions, such as "flaps 10" and "flaps 20."

As illustrated in FIG. 3A, in embodiments, the flap 30 is in the first flap position (e.g., "flap 0"). When the flap 30 is in the first flap position, the forward flap portion 36 and the aft flap portion 38 may be in alignment with the aircraft wing 28. Further, in embodiments, the aircraft wing 28 and the flap 30 are configured to cooperate to minimize exposure of the inlet 44 to air outside the aircraft 12 when the flap 30 is in the first flap position. In certain embodiments, the aircraft wing 28 includes a seal configured to seal against the inlet 44 to minimize exposure of the inlet 44 to air outside the aircraft 12 (e.g., the freestream) when the flap 30 is in the first flap position. In various embodiments, the aircraft wing 28 is configured to completely shield the flap 30 from the freestream such that exposure of the inlet 44 to the freestream is minimized.

As illustrated in FIG. 3B, in embodiments, the flap 30 is in one of the additional intermediate flap positions (e.g., "flap 10" or "flap 20") between the first flap position and the second flap position. When the flap 30 is in one of the additional flap positions, the forward flap portion 36 extends away from the aircraft wing 28 and the aft flap portion 38 partially rotates downward toward the lower surface portion 26 of the aircraft wing 28 such that the inlet 44 is out of alignment with the stagnation point. Further, in embodiments, the aircraft wing 28 and the flap 30 are configured to cooperate to minimize exposure of the inlet 44 to air outside the aircraft 12 when the flap 30 is in one of the additional intermediate flap positions.

As illustrated in FIG. 3C, in embodiments, the flap 30 is in the second flap position (e.g., "flap 39"). When the flap 30 is in the second flap position, the forward flap portion 36 extends away from the aircraft wing 28 and the aft flap portion 38 has rotated downward toward the lower surface portion 26 of the aircraft wing 28 such that the inlet 44 is in alignment with the stagnation point that develops adjacent the leading edge 40 when the flap 30 moves through air. Further, in embodiments, the aircraft wing 28 and the flap 30 are configured to cooperate to permit exposure of the inlet 44 to air outside the aircraft 12 when the flap 30 is in the second flap position.

Figure 4A:
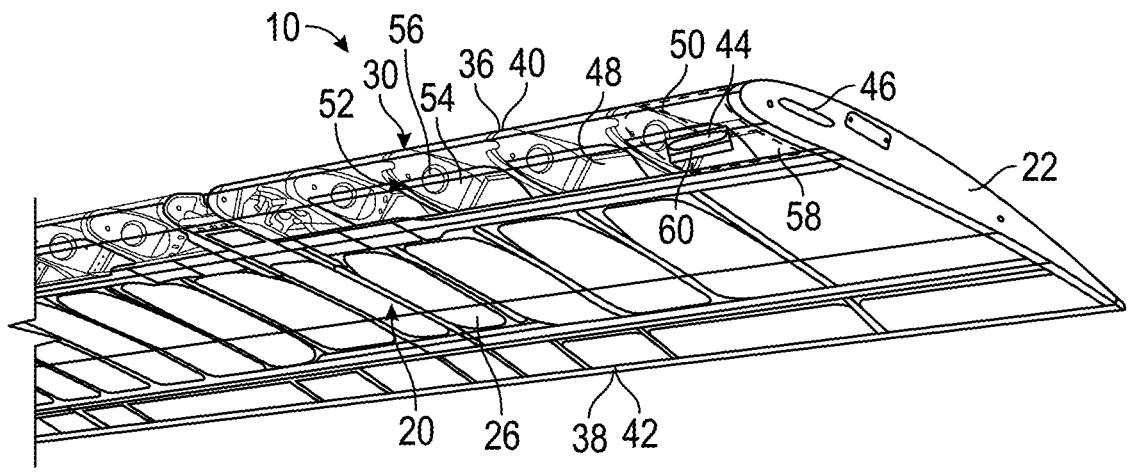
FIGS. 4A and 4B are perspective views illustrating the flap of FIG. 1 with the flap including a cover.
Figure 4B:
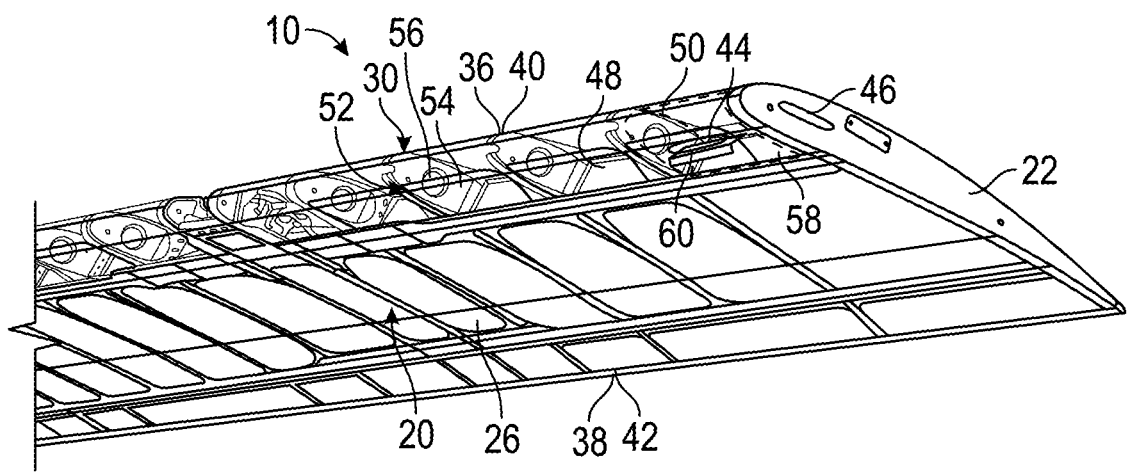

FIGS. 4A and 4B are perspective views illustrating the flap 30 of FIG. 1 with the flap 30 partially in phantom. In embodiments, the flap 30 has an inner surface 48 opposite the outer surface 20 of the flap 30 with the inner surface 48 defining a cavity 50 within the flap 30. It is to be appreciated that that inner surface 48 may define more than one cavity. The cavity 50 may be defined adjacent the forward flap portion 36 of the flap 30. In embodiments, the inlet 44 and the outlet 46 are in fluid communication with the cavity 50 such that the inlet 44 and the outlet 46 are in fluid communication with each other through the cavity 50. The flap 30 may include a plurality of support beams 52 with each of the support beams 52 including a web 54 extending perpendicular to the inner surface 48. The web 54 may define a web opening 56 such that additional cavities in the flap 30 are in fluid communication with each other and the cavity 50 through the web opening 56. In certain embodiments, the flap 30 further includes a housing 58 disposed adjacent the inner surface 48 such that the cavity 50 is defined by the housing 58 with the inlet 44 and the outlet 46 in fluid communication with the cavity 50 through the housing 58. In embodiments, the housing 58 is configured to seal the cavity 50 such that air moving through the inlet 44 is only exhausted through the outlet 46, and not to other areas of the flap 30 (e.g., additional cavities through the web openings). In embodiments, a duct may be disposed in the cavity 50 with the duct in fluid communication with the inlet 44 and the outlet 46 such that the inlet 44 and the outlet 46 are in fluid communication with each other through the duct.

The airfoil 10 further includes a cover 60 overlying the inlet 44. In embodiments, the cover 60 is disposed on the inner surface 48 of the flap 30 overlying the inlet 44. In certain embodiments, the cover 60 is coupled to the housing 58 such that the cover 60 is disposed in the cavity 50 of the flap 30. However, it is to be appreciated that the cover 60 may be disposed exterior to the flap 30 on the outer surface 20. The cover 60 is movable between a first cover position and a second cover position. However, it is to be appreciated that the cover 60 may be moveable to additional cover positions. It is also to be appreciated that any additional inlets may include the cover 60 with each of the covers 60 configured to move independent of each other.

As shown in FIG. 4A, the cover 60 is configured to prevent movement of air through the inlet 44 when the cover 60 is in the first cover position. As shown in FIG. 4B, the cover 60 is configured to permit movement of air through the inlet 44 when the cover 60 is in the second cover position. In embodiments, the cover 60 is configured to be in the first cover position when the flap 30 is in the first flap position and the cover 60 is configured to be in the second cover position when the flap 30 is in the second flap position. Further, in embodiments, the cover 60 is configured to be in the first cover position when the flap 30 is in one or more of the additional flap positions, such as the additional flap position shown in FIG. 3B. As such, when the flap 30 is in the first flap position, or in embodiments in the additional flap position, the cover 60 prevents movement of air through the inlet 44, and when the flap 30 is in the second flap position, the cover 60 permits movement of air through the inlet 44

In embodiments, the cover 60 is configured to move between the first cover position and the second cover position in the presence of air pressure (e.g., stagnation pressure of the freestream). In embodiments, the air pressure is in an amount greater than freestream pressure. In embodiments, the cover 60 is biased toward the first cover position and is configured to move from the first cover position to the second cover position in the presence of air pressure in an amount greater than freestream pressure. The cover 60 may be biased toward the first cover position with a force greater than the force of any air pressure present on the cover 60 when the flap 30 is in the first flap position. Further, the cover 60 may be configured to be biased toward the first cover position with a force lower than the force of the air pressure present on the cover 60 when the flap 30 is in the second flap position. The air pressure will develop at the stagnation point of the flap 30 while the flap 30 moves through air. In this respect, the movement of the cover 60 proceeds in a "passive" manner. In other words, the cover 60 moves between the first cover position and the second cover position without the use of pumps, actuators, or any other "active" manner for moving the cover 60. As such, when the flap 30 is in the first flap position, the inlet 44 may be shielded from the freestream such that exposure of the inlet 44 to the freestream is minimized, thereby, limiting the cover 60 to the presence of any air pressure or excrescence drag due to profile. When the flap 30 is in the second flap position, the inlet 44 is exposed to the freestream of air and is in alignment with the stagnation point of the flap 30, thereby, exposing the cover 60 to the stagnation pressure of the freestream. Further, in embodiments, when the flap 30 is in one or more of the additional flap positions, the inlet 44 is out of alignment with the stagnation point of the flap 30, thereby, limiting the cover 60 to the presence of stagnation pressure of the freestream.

Figure 5:
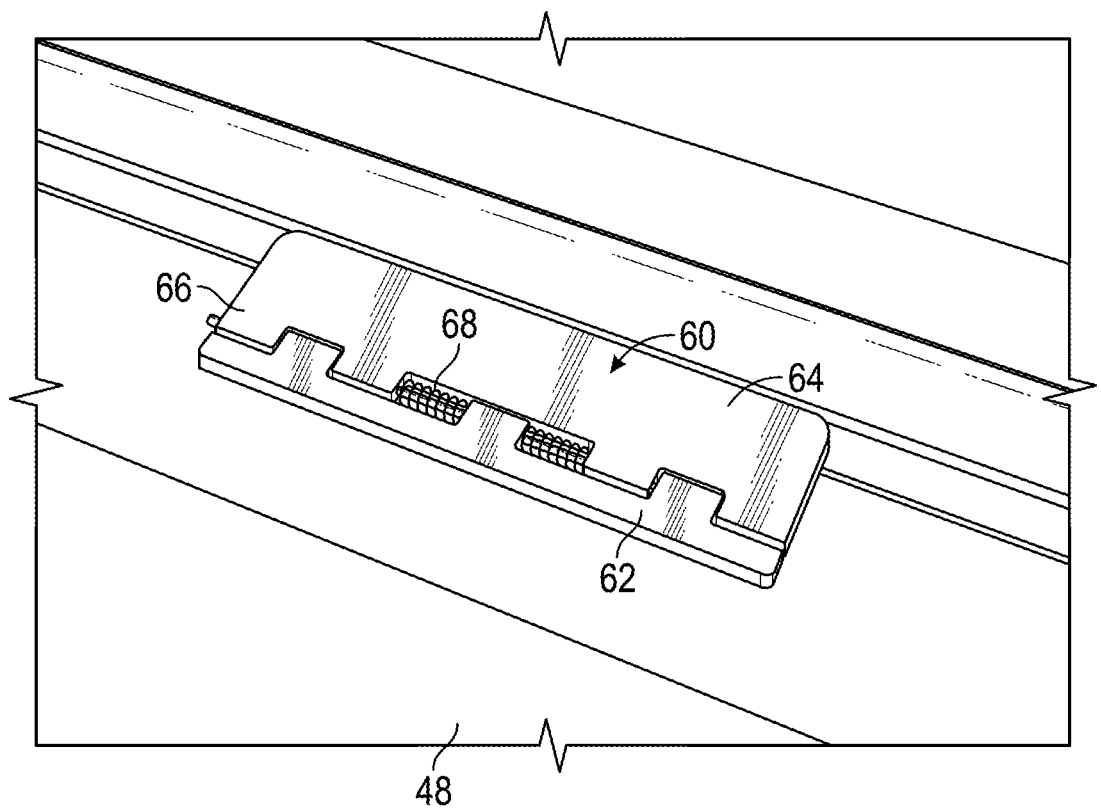
FIG. 5 is a perspective cut-away view illustrating the inner surface of the flap including the cover of FIGS. 4A and 4B.

FIG. 5 is a perspective cut-away view illustrating the inner surface 48 of the flap 30 including the cover 60 of FIGS. 4A and 4B. In embodiments, the cover 60 includes a fixed portion 62 and a covering portion 64 pivotably coupled to the fixed portion 62. The fixed portion 62 may be coupled to the inner surface 48 of flap 30. The fixed portion 62 may be coupled to the inner surface 48 by any manner known in the art. The covering portion 64 is configured to seal against the inlet such that the covering portion 64 pivots between the first cover position to prevent movement of air through the inlet and the second cover position to permit movement of air through the inlet. The cover 60 may further include a hinge 66 disposed between the fixed portion 62 and the covering portion 64 with the hinge 66 pivotably coupling the covering portion 64 to the fixed portion 62. The covering portion 64 pivots about the hinge 66 relative to the fixed portion 62 between the first cover position and the second cover position. The hinge 66 may include a spring 68 to bias the covering portion 64 toward the first cover position. The spring 68 may be configured to bias the covering portion 64 toward the first cover position with a force greater than the force of any air pressure present on the cover 60 when the flap 30 is in the first flap position. Further, the spring 68 may be configured to bias the covering portion 64 toward the first cover position with a force lower than the force of the air pressure present on the cover 60 when the flap 30 is in the second flap position.

In an exemplar embodiment, the force of the air pressure on the cover 60 when the flap 30 is transitioning from the first flap position to the second flap position is less than the minimum force necessary to overcome the force of the spring 68 biasing the covering portion 64 toward the first cover position. Therefore, when the flap 30 is not in the second flap position, the covering portion 64 continues to seal against the inlet 44 to prevent movement of air outward through the inlet 44 as well as prevents air from exhausting through the outlet 46 away from the side surface 22. In contrast, in an exemplar embodiment, the force of the air pressure on the cover 60 when the flap is in the second flap position is at least the minimum force necessary to overcome the force of the spring 68 biasing the covering portion 64 toward the first cover position. Therefore, the covering portion 64 pivots from the first cover position to the second cover position to permit movement of air through the inlet 44 and, thus, permits air to exhaust through the outlet 46 away from the side surface 22. Without the cover 60, unwanted drag and/or noise could result as high velocity air passes along the inlet 44.

In other embodiments of the airfoil 10, the aircraft wing 28 has the leading edge 40 and the flap 30 has the trailing edge 42. In these embodiments, the leading edge 40 is adjacent the forward wing portion 32 and the trailing edge 42 is adjacent the aft flap portion 38. In these embodiments, when the leading edge 40 is adjacent the forward wing portion 32, the aircraft wing 28 defines the inlet 44 with the inlet 44 configured to be in alignment with a stagnation point that develops common to the leading edge 40 when the aircraft wing 28 moves through air. As described above, the outlet 46 is in fluid communication with the inlet 44 such that air received by the inlet 44 from the environment is exhausted through the outlet 46 and back to the environment.

In other embodiments of the airfoil 10, the aircraft wing 28 has the leading edge 40 and the trailing edge 42. In these embodiments, the leading edge 40 is adjacent the forward wing portion 32 and the trailing edge 42 is adjacent the aft wing portion 34. In these embodiments, when the leading edge 40 is adjacent the forward wing portion 32, the aircraft wing 28 defines the inlet 44 with the inlet 44 configured to be in alignment with a stagnation point that develops adjacent the leading edge 40 when the aircraft wing 28 moves through air. Also in these embodiments, the aircraft wing 28 has the side surface 22 with the outlet 46 defined by the side surface 22. As described above, the outlet 46 is in fluid communication with the inlet 44 such that air received by the inlet 44 from the environment is exhausted through the outlet 46 and back to the environment.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. An airfoil having reduced noise generation for use with an aircraft, the airfoil comprising:
   a body having a leading edge spaced from a trailing edge and a side surface disposed between the leading edge and the trailing edge, the body defining an inlet proximate to the leading edge and configured to receive air, the side surface defining an outlet in fluid communication with the inlet, and the outlet configured to exhaust air away from the side surface; and
   a cover overlying the inlet and movable between a first cover position and a second cover position, and the cover configured to prevent movement of air through the inlet when the cover is in the first cover position and configured to permit movement of air through the inlet when the cover is in the second cover position, wherein the cover is biased toward the first cover position and is configured to move from the first cover position to the second cover position in response to a stagnation pressure on the cover when the body is in a second position in which the stagnation pressure is aligned with the cover.

2. The airfoil of claim 1, wherein the body comprises an aircraft wing and a flap moveably coupled to the aircraft wing and having the side surface.

3. The airfoil of claim 2, wherein the flap has the leading edge and the trailing edge, and the flap defines the inlet proximate the leading edge of the flap.

4. The airfoil of claim 2, wherein the aircraft wing has the leading edge and the flap has the trailing edge, and the aircraft wing defines the inlet proximate the leading edge of the aircraft wing.

5. The airfoil of claim 2, wherein the side surface of the flap defines the outlet.

6. The airfoil of claim 2, wherein the flap is moveable relative to the aircraft wing between a first flap position and a second flap position, and the cover is in the first cover position when the flap is in the first flap position and in the second cover position when the flap is in the second flap position.

7. The airfoil of claim 1, wherein the body has an inner surface and an outer surface, the inner surface defines a cavity within the body, and the cover is disposed on the inner surface overlying the inlet.

8. The airfoil of claim 7, wherein the cover comprises a fixed portion coupled to the inner surface of the body and a covering portion pivotably coupled to the fixed portion and configured to seal against the inlet such that the covering portion pivots between the first cover position to prevent movement of air through the inlet and the second cover position to permit movement of air through the inlet.

9. The airfoil of claim 1, wherein the outlet is configured to exhaust air away from and transverse to the side surface.

10. The airfoil of claim 9, wherein the outlet is configured to exhaust air away from and perpendicular to the side surface.

11. An aircraft comprising:
an airfoil, the airfoil comprising:
an aircraft wing coupled to the aircraft;
a flap movably coupled to the aircraft wing and having a leading edge spaced from a trailing edge, the flap having a side surface disposed between the leading edge and the trailing edge, the flap defining an inlet proximate the leading edge and configured to receive air, the side surface defining an outlet in fluid communication with the inlet, and the outlet configured to exhaust air away from the side surface; and
a cover overlying the inlet and movable between a first cover position and a second cover position, and the cover configured to prevent movement of air through the inlet when the cover is in the first cover position and configured to permit movement of air through the inlet when the cover is in the second cover position,
wherein the cover is biased toward the first cover position and is configured to move from the first cover position to the second cover position in response to a stagnation pressure on the cover when the flap is in a second flap position in which the stagnation pressure is aligned with the cover.

12. The aircraft of claim 11, wherein the flap is moveable relative to the aircraft wing between a first flap position and the second flap position, and the cover is in the first cover position when the flap is in the first flap position and in the second cover position when the flap is in the second flap position.

13. The aircraft of claim 11, wherein the flap has an inner surface and an outer surface, the inner surface defines a cavity within the flap, and the cover is disposed on the inner surface overlying the inlet.

14. The aircraft of claim 13, wherein the cover comprises a fixed portion coupled to the inner surface of the flap and a covering portion pivotably coupled to the fixed portion and configured to seal against the inlet such that the covering portion pivots between the first cover position to prevent movement of air through the inlet and the second cover position to permit movement of air through the inlet.

15. The aircraft of claim 11, wherein the outlet is configured to exhaust air away from and transverse to the side surface.

16. An aircraft comprising:
an airfoil, the airfoil comprising:
an aircraft wing coupled to the aircraft;
a flap movably coupled to the aircraft wing and having a leading edge spaced from a trailing edge, the flap having a side surface disposed between the leading edge and the trailing edge, the flap defining an inlet proximate the leading edge and configured to receive air, the side surface defining an outlet in fluid communication with the inlet, and the outlet configured to exhaust air away from the side surface; and
a cover overlying the inlet and movable between a first cover position and a second cover position, and the cover configured to prevent movement of air through the inlet when the cover is in the first cover position and configured to permit movement of air through the inlet when the cover is in the second cover position;
wherein the flap is moveable relative to the aircraft wing between a first flap position and a second flap position, and the cover is in the first cover position when the flap is in the first flap position and is in the second cover position when the flap is in the second flap position; and
wherein the flap has an inner surface and an outer surface, the inner surface defines a cavity within the flap, and the cover is disposed on the inner surface overlying the inlet, and
wherein the cover is biased toward the first cover position and is configured to move from the first cover position to the second cover position in response to a stagnation pressure on the cover when the flap is in the second flap position in which the stagnation pressure is aligned with the cover.

\* \* \* \* \*